United States Patent
Nitschke et al.

(10) Patent No.: US 6,836,714 B1
(45) Date of Patent: Dec. 28, 2004

(54) METHOD FOR DATA TRANSMISSION BETWEEN A CONTROL UNIT FOR RESTRAINT DEVICES AND SENSORS

(75) Inventors: Werner Nitschke, Ditzingen (DE); Thomas Huber, Beilstein (DE); Peter Schaedler, Ludwigsburg (DE); Michael Bischoff, Adelschlag (DE); Ruediger Deppe, Ingolstadt (DE); Guenter Fendt, Schrobenhausen (DE); Norbert Mueller, Schrobenhausen (DE); Johannes Rinkens, Regensburg (DE); Stefan Schaeffer, Ingolstadt (DE); Werner Steiner, Schrobenhausen (DE)

(73) Assignees: Robert Bosch GmbH, Stuttgart (DE); Temic Telefunken Microelectric GmbH, Heilbronn (DE)

( * ) Notice: Subject to any disclaimer, the term of this patent is extended or adjusted under 35 U.S.C. 154(b) by 458 days.

(21) Appl. No.: 09/856,611
(22) PCT Filed: Aug. 29, 2000
(86) PCT No.: PCT/DE00/02948
§ 371 (c)(1),
(2), (4) Date: Jan. 25, 2002
(87) PCT Pub. No.: WO01/21447
PCT Pub. Date: Mar. 29, 2001

(30) Foreign Application Priority Data

Sep. 23, 1999 (DE) ........................... 199 45 614

(51) Int. Cl.⁷ ............................................. G06F 7/00
(52) U.S. Cl. ........................ 701/45; 280/734; 280/735
(58) Field of Search ........................... 701/45; 280/734, 280/735; 710/1, 3, 4, 45

(56) References Cited

U.S. PATENT DOCUMENTS

| | | | | |
|---|---|---|---|---|
| 4,399,332 A | * | 8/1983 | Furlan et al. | 379/112.06 |
| 4,870,704 A | * | 9/1989 | Matelan et al. | 710/120 |
| 5,593,430 A | * | 1/1997 | Renger | 607/18 |
| 5,757,672 A | * | 5/1998 | Hoepken | 702/116 |
| 5,874,904 A | * | 2/1999 | Hirabayashi et al. | 340/903 |
| 5,899,949 A | | 5/1999 | Kincaid | |
| 5,959,552 A | * | 9/1999 | Cho | 340/903 |

FOREIGN PATENT DOCUMENTS

| | | |
|---|---|---|
| DE | 199 63 267 | 7/2000 |
| EP | 0 407 391 | 9/1991 |
| WO | WO 98 09844 | 3/1998 |

* cited by examiner

Primary Examiner—William A. Cuchlinski, Jr.
Assistant Examiner—Olge Hernandez
(74) Attorney, Agent, or Firm—Kenyon & Kenyon

(57) ABSTRACT

A method for having the control unit access the measured data of individual sensors flexibly over time, and includes providing for the control unit to transmit a request message to the sensors, and having each sensor, by comparing the request message with its own address, derive whether and in what time slot, it should transmit its measured data to the control unit.

6 Claims, 2 Drawing Sheets

METHOD FOR DATA TRANSMISSION BETWEEN A CONTROL UNIT FOR RESTRAINT DEVICES AND SENSORS

FIELD OF THE INVENTION

The present invention is directed to a method for data transmission between a control unit for restraint devices and sensors.

BACKGROUND INFORMATION

The effectiveness of restraint systems in vehicles may improve sharply in the future in order to further improve the protection for the vehicle occupants. This may mean that the number of restraint devices in the vehicle will increase.

These restraint devices may then include, for example, multi-stage ignitable airbags for the driver and front seat passenger, knee bags for the driver and front seat passenger, side airbags for the driver, front seat passenger and rear occupants, side airbags being provided for both the head as well as for the chest area. In addition, restraint devices include belt tensioners, which also have multi-stage activation, roll bars, etc. Thus a complex protection system made up of a plurality of restraint devices is installed in the vehicle for every occupant.

In order to activate all these restraint devices so that they offer the vehicle occupants effective protection, a large number of sensors may be required to detect accident-specific vehicle parameters. These include sensors which detect the vehicle acceleration in various directions at various locations of the vehicle, pre-crash sensors, angular rate sensors, sensors which monitor the vehicle interior to detect the type of seat occupancy, the position of the vehicle occupants, child seats, etc.

A control unit present in the vehicle, which controls the deployment of the individual restraint devices, is connected to all the sensors in order to analyze their signals. It is believed that the introduction of a bus system which interconnects all sensors and the control unit makes it possible to dispense with voluminous wiring harnesses. Such a bus system for a large number of sensors, as explained in the introduction, is discussed, for example in European Patent Application No. 0 407 391.

According to this reference, the control unit determines the number and types of the operational sensors available and assigns a consecutive number to each sensor detected before a data transmission occurs between it and the individual sensors. This consecutive number stipulates the sequence of the communication of the sensors with the control unit. During the communication of the control unit with the sensors, all sensors always transmit in the same chronological sequence according to their assigned number in permanently set time slots.

SUMMARY OF THE INVENTION

An object of the exemplary embodiment of the present invention is to provide a method for providing flexible access of the control unit to the measured data of the individual sensors over time.

In this regard, the control unit transmits a request message to the sensors and that each sensor, by comparing the request message with its own address, derives whether and in what time slot it should transmit its data to the control unit. In this way, it is believed that time slots can be flexibly assigned to the individual sensors for the transmission of their measured data to the control unit. In this way, the priorities of the individual sensors can be adapted to different vehicle types or accident scenarios.

It may thus be provided that the agreement of at least one part of their address made up of a plurality of bits with at least one part of the request message made up of a plurality of bits provides information for the sensors as to whether the sensor in question should transmit its data continuously in a fixed time pattern or whether it should transmit its data once in a time slot identified by the request message. Also, time slots may be assigned to a plurality of sensors with one request message, of which one part agrees with one part of the addresses of a plurality of sensors.

It is believed to be expedient to have the sensors, whose recorded measured values are to be processed by the control unit with as little time delay as possible, transmit their data in time slots which are located at the end of the time slot sequence.

Also, the control unit may transmit a plurality of control bits together with the request message via the bus line, the control bits reporting to the sensors addressed by the request message that either they should select a specific memory register from a plurality present within them so that information can be written to it and read out of it, or information should be written into the selected memory register, or information should be read out of the selected memory register, or measured data should be transmitted to the control unit.

DETAILED DESCRIPTION

Figure 1:
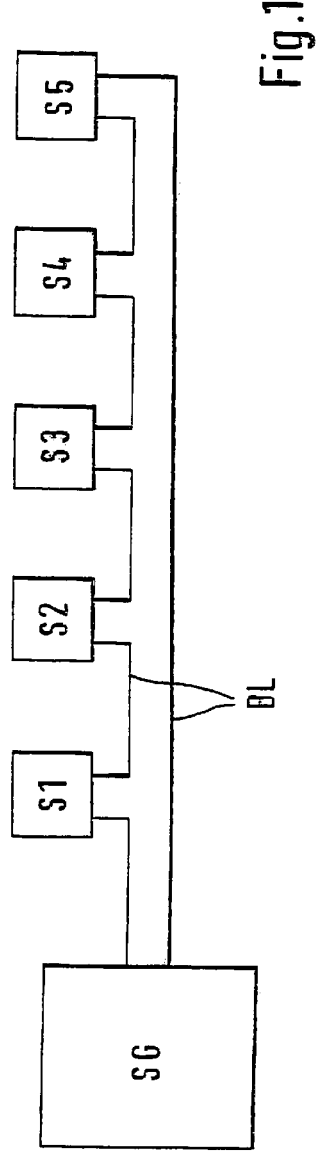
FIG. 1 shows a block diagram of a control unit and a plurality of sensors connected to it via a bus line.

The block diagram in FIG. 1 shows a control unit SG which, with the aid of an algorithm, controls the deployment of a plurality of restraint devices, which are not shown, arranged in a vehicle. These restraint devices may include different kinds of airbags installed at various locations in the vehicle or belt tensioners or roll bars or other occupant protection devices. To determine the deployment criteria for the individual restraint devices, control unit SG requires measured data from a plurality of sensors S1, S2, S3, S4, S5, which detect accident-specific vehicle parameters.

Such sensors, of which five are shown by way of example in FIG. 1, are, for example, acceleration sensors that are arranged either centrally in the vehicle or in the side, front-end or rear area of the vehicle, or pre-crash sensors or angular rate sensors for the detection of a rollover event or speed sensors or sensors for interior monitoring in order to be able to determine the type of seat occupancy, i.e. the seating positions of vehicle occupants. All types of sensors may be included with which the nature and severity of a vehicle crash and also the seat occupancy in the vehicle and the positions of the vehicle occupants can be detected in order to be able to activate the available restraint devices from their measured data so that the occupants are assured optimum protection.

As FIG. 1 shows, all sensors S1 to S5 are connected to control unit SG via a bus line BL. Bus line BL may have a serial, a ring-shaped, a star-shaped or a tree-shaped structure. The way in which a data exchange now takes place between control unit SG and individual sensors S1 to S5 via bus line BL is explained with reference to the data frame shown in FIGS. 2 to 4.

Each sensor S1 to S5 has a number of memory registers, each of which is assigned a register address. There are memory registers, e.g., a ROM register, PROM register or RAM register in which the sensor address is stored, other memory registers in which information concerning the type of sensor, the production date of the sensor in question, the lot number of the sensor, manufacturer-specific data of the sensor, the ASIC version of the sensor and manufacturer-specific parameters for the test signal analysis are stored.

In addition, memory registers may be provided in which defaults for the measured data resolution can be stored, and still other memory registers for the recording of other information of significance to the operation of the restraint systems. Information from control unit SG is written to some memory registers and control unit SG reads the information stored there out of other memory registers.

Figure 2:
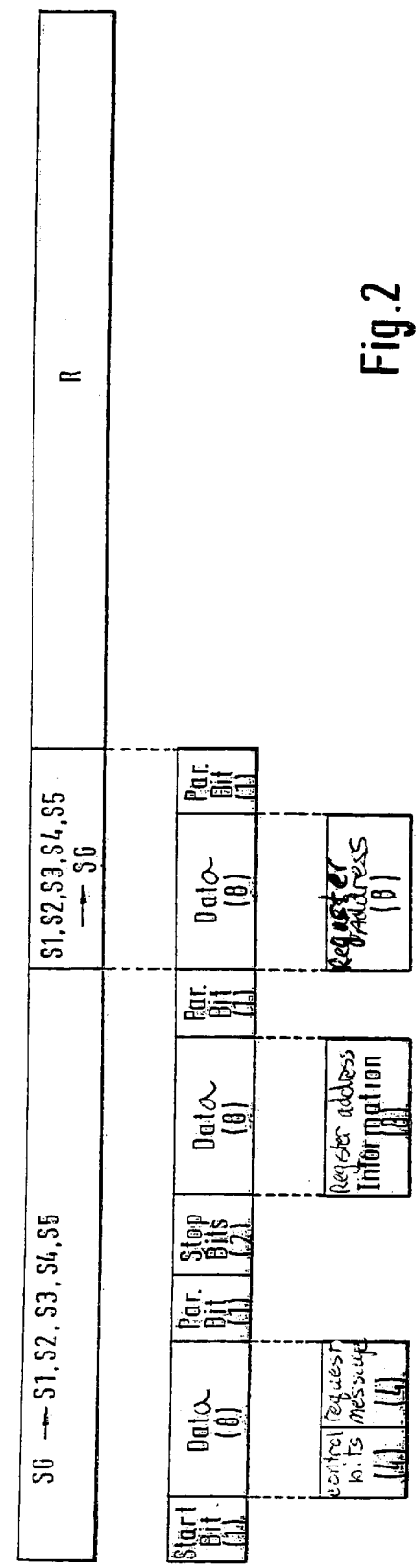
FIG. 2 shows a data frame for the selection of registers and the writing of information to the selected register of a selected sensor.

FIG. 2 shows the structure of a data frame for the event that control unit SG selects a specific memory register in a sensor and writes information to this selected memory register. The data frame has a first part in which control unit SG transmits the message to one of the, for example, here five sensors, S1, S2, S3, S4, S5 that a very specific memory register should be selected in this specific sensor. In a second part of the data frame, this sensor confirms the selection of this memory register. Since each data frame used for the communication between the control unit and sensors SI to S5 is of the same length, the remaining part R of the data frame which is not needed for a data transmission from control unit SG to sensors S1 to S5 or from sensors S1 to S5 to control unit SG is filled with stop bits which maintain the bit timing.

That part of the data frame in which control unit SG transmits its information to one of sensors S1 to S5 commences with a start bit. This is followed by eight data bits followed by a parity bit and two stop bits and finally by an additional eight data bits and a parity bit at the end. The first eight data bits are made up of four control bits and a request message comprised of four bits. Via the four control bits, the type of information transmitted is reported to addressed sensors S1 to S5 as to whether the sensor in question should select a specific memory register or whether information should be written to or out of a selected memory register or whether the sensor should transmit measured data to control unit SG. The request message made up of four bits reproduces the address of the selected sensor.

If a specific memory register is to be selected in the sensor in question, the address of that memory register is located in the second data block made up of eight bits. If information is to be written to a memory register selected previously, the information to be written is located in this second data block. To verify that a memory register has been selected in the sensor in question or that information has been written to this memory register, the sensor in question transmits a data block made up of eight bits with a subsequent parity bit back to control unit SG. The address of the selected memory register is located in this data block.

Figure 3:
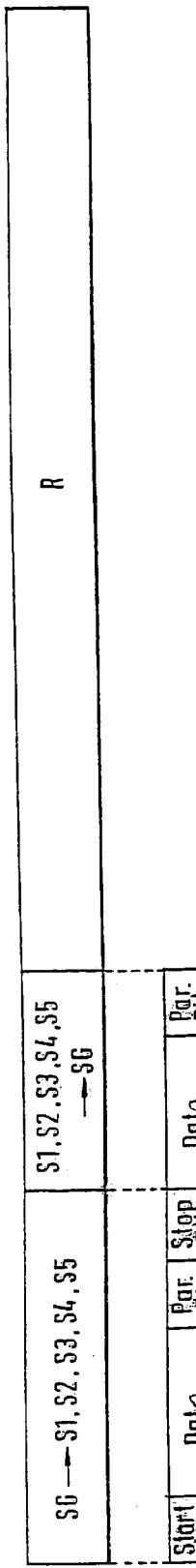
FIG. 3 shows a data frame for reading information out of a selected register of a specific sensor.

FIG. 3 shows the structure of the data frame for the event that control unit SG intends to read information out of a previously selected memory register of a specific sensor S1 to S5. Then the part of the data frame which is transmitted by control unit SG to a sensor S1 to S5 commences with a start bit which is followed by a data block of 8 bits, a parity bit and two stop bits. The data block is again made up of 4 control bits and one request message with 4 bits. The control bits inform the sensor that the information is to be read out of a selected memory register. The request message made up of 4 bits contains the address of the addressed sensor. After this sensor has read out the content of the selected memory register, it transmits it in a data block with 8 bits to control unit SG. As usual, a parity bit follows the data block.

Figure 4:
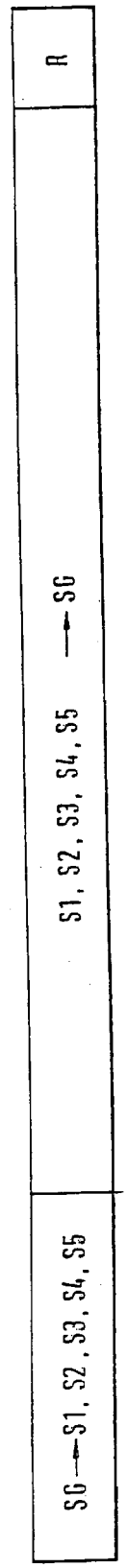
FIG. 4 shows a data frame for the transmission of measured data of a plurality of sensors.
Figure 4:
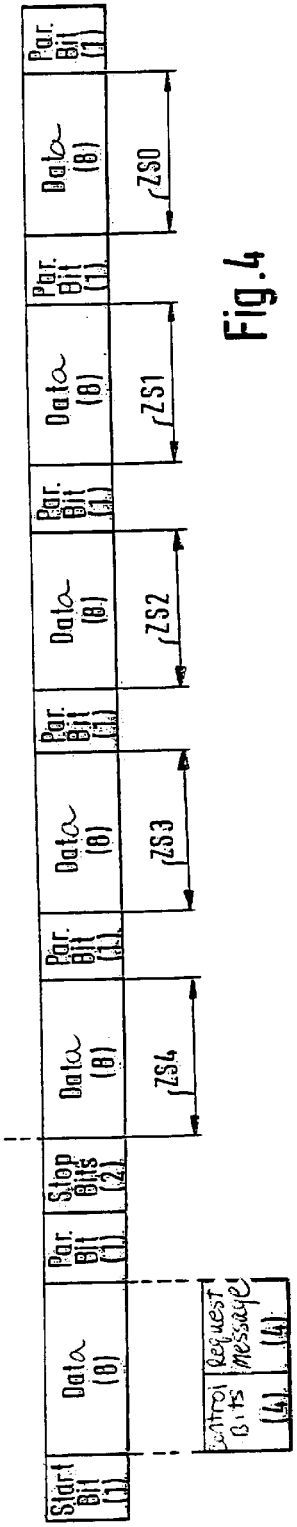

FIG. 4 shows a data frame responsible for the transmission of measured data from sensors Si to S5 to control unit SG. That part of the data frame in which control unit SG requests one or more sensors S1 to S5 to transmit their measured data commences with a start bit which is followed by a data block of 8 bits, one parity bit and two stop bits. The data block is made up of 4 control bits and 4 bits for a request message. The control bits inform sensors S1 to S5 that measured data are to be transmitted to control unit SG. The request message informs individual sensors S1 to S5 which of the sensors should transmit its measured data to control unit SG in which time slot ZS0, ZS1, ZS2, ZS3, ZS4.

The area of the data frame in which sensors S1 to S5 send their measured data to control unit SG is divided into five time slots ZS0 to ZS4 in the exemplary embodiment shown. The following two tables are intended to explain how the measured data (made of 8 bits with one parity bit each) of the individual sensors S1 to S5 can be distributed to available time slots ZS0 to ZS4. The two tables are comprised of five columns, the sensors being numbered consecutively in the first column.

The two tables assume that there are twelve sensors, for example. The addresses of the sensors made of 4 bits a0, a1, a2 and a3 are shown in the second column of the tables. The following column contains possible embodiments of the response message made of 4 bits A0, a1, A2 and A3 transmitted by control unit SG. An additional column contains the time slots in which the individual sensors transmit their measured data to the control unit. In the last column of the two tables, the transmission mode for sensors S1 to S5 is characterized.

TABLE 1

| Sensor No. | Sensor address a3 . . . a0 | Request message A3 . . . A0 | Time slot | Transmission mode |
| --- | --- | --- | --- | --- |
| — | 0000 | — | — | reserved |
| — | 0001 | — | — | reserved |
| — | 0010 | — | — | reserved |
| — | 0011 | — | — | reserved |
| 1 | 0100 | 0xxx | ZS0 | transmits continuously |
| 2 | 0101 | 0xxx | ZS1 | transmits continuously |
| 3 | 0110 | 0xxx | ZS2 | transmits continuously |
| 4 | 0111 | 0xxx | ZS3 | transmits continuously |
| 5 | 1000 | 1000 | ZS4 | transmits on request |
| 6 | 1001 | 1001 | ZS4 | transmits on request |
| 7 | 1010 | 1010 | ZS4 | transmits on request |
| 8 | 1011 | 1011 | ZS4 | transmits on request |
| 9 | 1100 | 1100 | ZS4 | transmits on request |
| 10 | 1101 | 1101 | ZS4 | transmits on request |
| 11 | 1110 | 1110 | ZS4 | transmits on request |
| 12 | 1111 | 1111 | ZS4 | transmits on request |

TABLE 2

| Sensor No. | Sensor address a3...a0 | Request message A3...A0 | Time slot | Transmission mode |
|---|---|---|---|---|
| — | 0000 | — | — | reserved |
| — | 0001 | — | — | reserved |
| — | 0010 | — | — | reserved |
| — | 0011 | — | — | reserved |
| 1 | 0100 | 01xx | ZS0 | transmits on request |
| 2 | 0101 | 01xx | ZS1 | transmits on request |
| 3 | 0110 | 01xx | ZS2 | transmits on request |
| 4 | 0111 | 01xx | ZS3 | transmits on request |
| 5 | 1000 | 10xx | ZS0 | transmits on request |
| 6 | 1001 | 10xx | ZS1 | transmits on request |
| 7 | 1010 | 10xx | ZS2 | transmits on request |
| 8 | 1011 | 10xx | ZS3 | transmits on request |
| 9 | 1100 | xx00 | ZS4 | transmits on request |
| 10 | 1101 | xx01 | ZS4 | transmits on request |
| 11 | 1110 | xx10 | ZS4 | transmits on request |
| 12 | 1111 | xx11 | ZS4 | transmits on request |

As can be inferred from the two tables, the first 4 addresses a0 to a3 are assigned to no specific sensors. These four addresses are reserved for other functions (for example, for the initialization of all sensors in the vehicle) rather than for the transmission of measured data of individual sensors S1 to S5 to control unit SG.

In the exemplary embodiment shown in Table 1, a request message, the A3 bit of which is a 0, requests all sensors 1, 2, 3 and 4 whose address starts with the bit a3=0 to transmit their measured data continuously in time slots ZS0, ZS1, ZS2 and ZS3, for example, in a periodically repeating time cycle of 250 μs. Bits A2, a1 and A0 labeled with x in the request message are of no significance to the named sensors with the numbers 1, 2, 3 and 4. These sensors respond with a measured data transmission because highest-order bit a3 of their address has a 0 as does highest-order bit A3 of the request message. The other sensors numbered 5 to 12 are addressed individually by the request message and are thus requested to transmit their measured data in time slot ZS4. The sensor whose sensor address coincides with all bits of the request message is always addressed. According to the time slot distribution to the sensors, there is thus one group (sensors 1 to 5) that continuously transmits in time slots ZS0, ZS1, ZS2 and ZS3 reserved for them because their measured data have the highest priority for the decision to deploy. And there is an additional group of sensors 5 to 12 of which one is always selected to transmit its measured data in time slot ZS4.

Table 2 shows another variant for the time assignment of the sensors to the individual time slots. If the two highest-order bits A3 and A2 of the request message transmitted by control unit SG to the sensors are set to 0 and 1, then as a result all sensors with those sensor addresses whose highest-order bits a3 and a2 are also set to 0 and 1 are addressed. The sensors with these addresses then transmit in time slots ZS0, ZS1, ZS2 and ZS3 which are permanently assigned to them. An additional group of sensors, specifically those whose highest-order address bits a3 and a2 are set to 1 and 0, is addressed by a request message of control unit SG whose highest-order bits A3 and A2 are set to these same values 1 and 0.

Like the individual sensors of the first group, the individual sensors of the second group are assigned to permanent time slots ZS0, ZS1, ZS2 and ZS3. Additional sensors are not requested via the request message to transmit their measured data to control unit SG in time slot ZS4 in groups as before but rather individually. These are the sensors whose addresses have the values 00, 01, 10 or 11 in low-order bits a1 and a0. It is always the sensor whose address bits a1, a0 coincide with low-order bits A1 and A0 of the request message that is requested to transmit its measured data.

If, for example, the request message transmitted by control unit SG had bit configuration 1011, then all sensors whose highest-order address bits a3 and a2 have the value 10 would transmit their measured data in time slots ZS0, ZS1, ZS2 and ZS3 and in addition, the sensor with sensor address 11 would transmit its measured data to control unit SG in time slot ZS4. The sensors ignore the bits labeled with an x in the request message.

It is thus evident that a very flexible assignment of the sensors to the individual time slots is possible via the request message of control unit SG. In departure from the versions shown in Tables 1 and 2 for the assignment of the sensors to the time slots available, other versions may be implemented.

It is believed to be expedient for sensors, whose measurement values are to be processed by the control unit with as little time delay as possible, to transmit their data in time slots located at the end of the time slot sequence. For example, time slots ZS0 and ZS1 in the embodiments described above are feasible for this purpose. Since, as can be seen in the figure, these time slots within the data frame are inserted into the bus line last, the time between the measured value acquisition of the sensors and the measured value processing of the control unit is the shortest.

Therefore, precisely those sensors are assigned to these time slots that ensure a high measured value update status because their chronological update statues is of particular importance for the deployment of restraint devices. In particular, this is believed to affect acceleration sensors arranged in the side area of the vehicle since it is well known that the time delay between the measured value acquisition and the deployment of the restraint devices must be extremely low for side crashes.

The data frames described above have a fixed timing. In this way, individual sensors S1, . . . , S5, which are synchronized to the timing, may access time slots that are not solely assigned to them alone, but rather also to time slots ZS0, . . . , ZS4 in which other sensors transmit their information. It is believed that this makes it possible for sensors to exchange information between each other. Thus, for example, sensors of identical design can tune each other; for example, similar acceleration sensors are set to a common base value or offset. In another example, sensors for vehicle interior monitoring, which detect the type of seat occupancy and the position of the vehicle occupants, can switch from a static measuring mode to a dynamic measuring mode if they receive information concerning an impending crash from other sensors.

While in the static measuring mode when the vehicle is in a non-critical state, the measuring cycle is long (approximately 100 μs), in the dynamic measuring mode when a crash situation is arising, the measuring cycle is much shorter (approximately 10 μs). The decision as to whether the airbags should inflate hard or soft or not at all in a crash situation critically depends on the position of the vehicle occupants relative to the airbags. However, since the position of the occupants can change very rapidly before a crash, a shorter measuring cycle corresponding to the dynamic measuring mode may at least be important.

What is claimed is:

1. A method for transmitting data between a control unit for a restraint device and a plurality of sensors for detecting accident-specific vehicle parameters, each of the plurality of sensors being connected to the control unit via a bus line and transmitting data via the bus line to the control unit in a time slot of a plurality of specified time slots, the method comprising:

assigning a corresponding address to each of the plurality of sensors by which each of the plurality of sensors is configured to be identified by the control unit;

transmitting a request message from the control unit to the plurality of sensors; and at each of the plurality of sensors, comparing the request message with an address of each of the plurality of sensors to determine whether and in which of the plurality of specified time slots, each of the plurality of sensors should transmit its data to the control unit, wherein the plurality of specified time slots are dynamically assigned to the plurality of sensors based on the request message.

2. The method of claim 1, wherein in the step of comparing, for each of the plurality of sensors, if at least one part of the corresponding address having a plurality of bits agrees with at least one part of the request message having a plurality of bits, it is determined whether data is to be transmitted continuously in a fixed time pattern or once in a time slot of the plurality of time slots identified by the request message.

3. The method of claim 2, wherein at least one part of the corresponding address agrees with at least one part of the request message, and the plurality of specified time slots is assigned to the plurality of sensors if the request message is a particular request message.

4. The method of claim 1, wherein each of the plurality of sensors whose recorded measured values are to be processed by the control unit with a minimum time delay transmits its data in a time slot located at an end of a sequence of the specified time slots.

5. The method of claim 1, wherein:

the control unit transmits a plurality of control bits together with the request message via the bus line; and the plurality of control bits reporting to the plurality of sensors addressed by the request message that each of the plurality of sensors should one of:

select a specific memory register from a plurality of memory registers within the plurality of sensors so that information is at least one of writeable to and readable out of the specific memory register selected;

write information into the specific memory register selected;

read out information from the specific memory register selected; and transmit measured data to the control unit.

6. The method of claim 1, wherein the plurality of sensors exchange information with each other in that of the plurality of sensors communicating with each other, each of the plurality of sensors accesses at least one of the plurality of specified time slots in a data frame associated with other ones of the plurality of sensors.

* * * * *